(12) United States Patent
Gourraud

(10) Patent No.: US 12,485,633 B2
(45) Date of Patent: Dec. 2, 2025

(54) METHOD FOR MANUFACTURING AN OPTICAL LENS BY ADDITIVE MANUFACTURING AND CORRESPONDING INTERMEDIATE OPTICAL ELEMENT

(71) Applicant: ESSILOR INTERNATIONAL, Charenton le Pont (FR)

(72) Inventor: Alexandre Gourraud, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 928 days.

(21) Appl. No.: 17/279,875

(22) PCT Filed: Sep. 24, 2019

(86) PCT No.: PCT/EP2019/075741
§ 371 (c)(1),
(2) Date: Mar. 25, 2021

(87) PCT Pub. No.: WO2020/064754
PCT Pub. Date: Apr. 2, 2020

(65) Prior Publication Data
US 2021/0394471 A1 Dec. 23, 2021

(30) Foreign Application Priority Data

Sep. 26, 2018 (EP) .................................. 18306258

(51) Int. Cl.
*B29D 11/00* (2006.01)
*B29C 64/188* (2017.01)
(Continued)

(52) U.S. Cl.
CPC ...... *B29D 11/00432* (2013.01); *B29C 64/188* (2017.08); *B29C 64/393* (2017.08);
(Continued)

(58) Field of Classification Search
CPC ....... G02C 7/02; B29C 64/106; B29C 64/188; B29C 64/10; B33Y 40/20; B69C 64/393;
(Continued)

(56) References Cited

U.S. PATENT DOCUMENTS

| | | | |
|---|---|---|---|
| 2003/0081172 A1* | 5/2003 | Dreher | B29D 11/00355 351/159.01 |
| 2005/0046957 A1* | 3/2005 | Lai | G02B 1/04 359/652 |

(Continued)

FOREIGN PATENT DOCUMENTS

| | | |
|---|---|---|
| CN | 105829074 A | 8/2016 |
| CN | 106335184 A | 1/2017 |
| WO | 2018/151850 A1 | 8/2018 |

OTHER PUBLICATIONS

NPL_Slicing procedures for layered manufacturing techniques_A_Dolenc_I_Makela (Year: 1994).*

(Continued)

*Primary Examiner* — Jeffrey M Wollschlager
*Assistant Examiner* — Edgaredmanuel Troche
(74) *Attorney, Agent, or Firm* — NIXON & VANDERHYE

(57) ABSTRACT

A method for manufacturing an optical lens by additive manufacturing, includes steps of: depositing a first layer having a first thickness; —depositing a second layer, having a second thickness, onto the first layer, the second layer forming a first asperity with the first layer; depositing a third layer having a third thickness; depositing a fourth layer having a fourth thickness onto the third layer, thereby forming an intermediate optical element, the fourth layer forming a second asperity with the third layer; and smoothing the first asperity and the second asperity on the intermediate optical element, thereby forming the optical lens.

(Continued)

The second thickness and the fourth thickness are different. A corresponding intermediate optical element is also described.

17 Claims, 5 Drawing Sheets

(51) Int. Cl.
*B29C 64/393* (2017.01)
*B33Y 10/00* (2015.01)
*B33Y 40/20* (2020.01)
*B33Y 50/02* (2015.01)
*B33Y 80/00* (2015.01)
*G02C 7/02* (2006.01)

(52) U.S. Cl.
CPC ............. *B33Y 10/00* (2014.12); *B33Y 40/20* (2020.01); *B33Y 50/02* (2014.12); *B33Y 80/00* (2014.12); *G02C 7/027* (2013.01)

(58) Field of Classification Search
CPC ........... B32B 7/12; B32B 17/10; B32B 7/023; B32B 2307/412; B32B 2307/418; B32B 2551/00; B29D 11/0073; B29D 11/00413; B29D 11/00009; G02B 6/136
See application file for complete search history.

(56) References Cited

U.S. PATENT DOCUMENTS

| | | |
|---|---|---|
| 2015/0153589 A1 | 6/2015 | Meschenmoser et al. |
| 2016/0101573 A1* | 4/2016 | Quere ............... B29C 64/106 425/166 |
| 2016/0114542 A1* | 4/2016 | Quere ............... B29C 64/106 264/1.1 |
| 2016/0311184 A1* | 10/2016 | Gourraud ............ B29C 64/40 |
| 2017/0100903 A1 | 4/2017 | Rodriguez et al. |

OTHER PUBLICATIONS

NPL_WeiyinMa_PeirenHe_An addaptive slicing and selecting hatching strategy (Year: 1999).*
Heinrich et al. "Additive manufacturing of optical components:"; Adv. Opt. Techn. 2016; 5(4): 293-301 (Year: 2016).*
Autodesk Ember 3D Printer, "VariSlice™—Variable Layer Slicing for 3D Printing"; Oct. 31, 2016; Retrieved from https://www.youtube.com/watch?v=HAmneiL5-jQ (Year: 2016).*
Wasserfall et al. ("Adaptive Slicing for the FDM Process Revisited"; 2017 13th IEEE Conference on Automation Science and Engineering (CASE) Xi'an, China, Aug. 20-23, 2017. (Year: 2017).*
Dolenc et al., "Slicing procedures for layered manufacturing techniques", Computer-Aided Design, Feb. 2, 1994, vol. 26, No. 2, pp. 119-126.
Office Action issued in Chinese Patent Application No. 201980064335.0, dated Jul. 14, 2022.
International Search Report and Written Opinion of the ISA for PCT/EP2019/075741, mailed Nov. 28, 2019, 18 pages.
Dolenc et al., "Slicing procedures for Layered Manufacturing Techniques", Computer Aided Design, vol. 26, No. 2, Feb. 1, 1994, pp. 119-126.

* cited by examiner

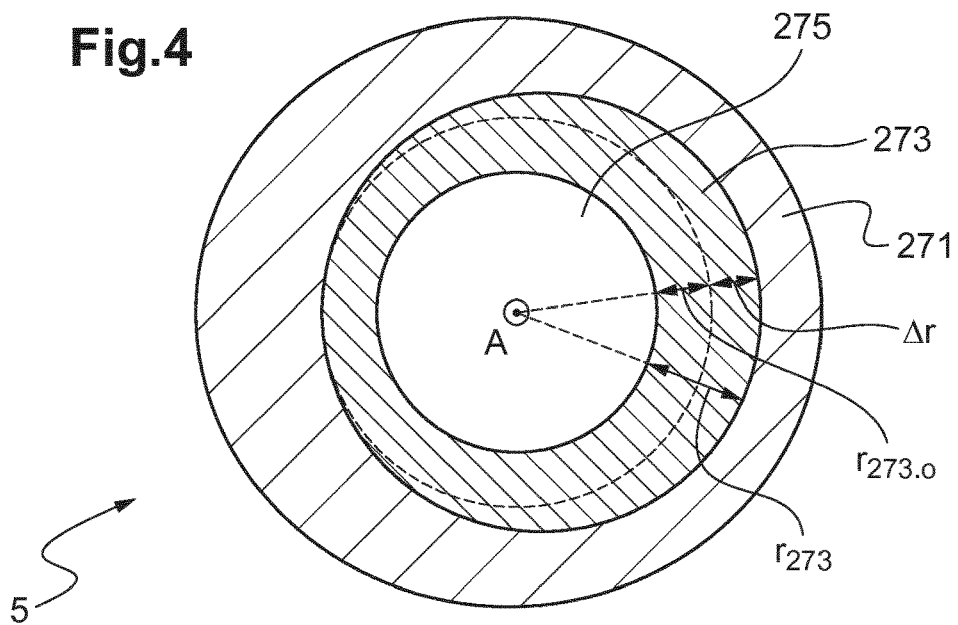
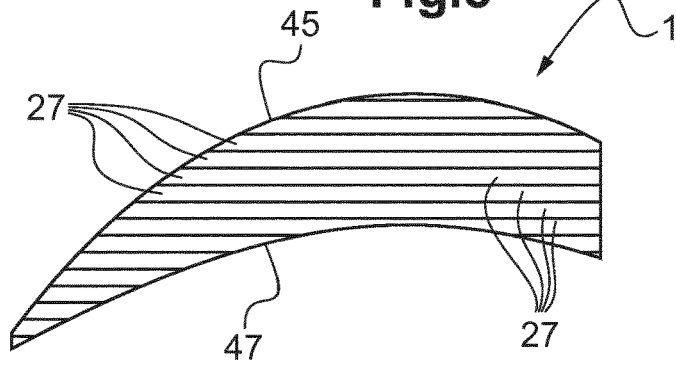
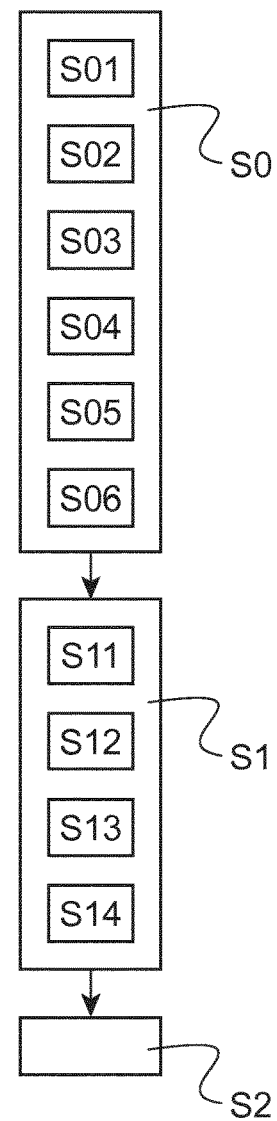

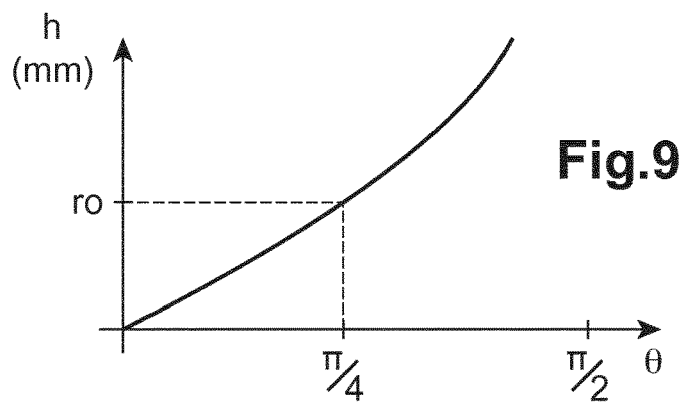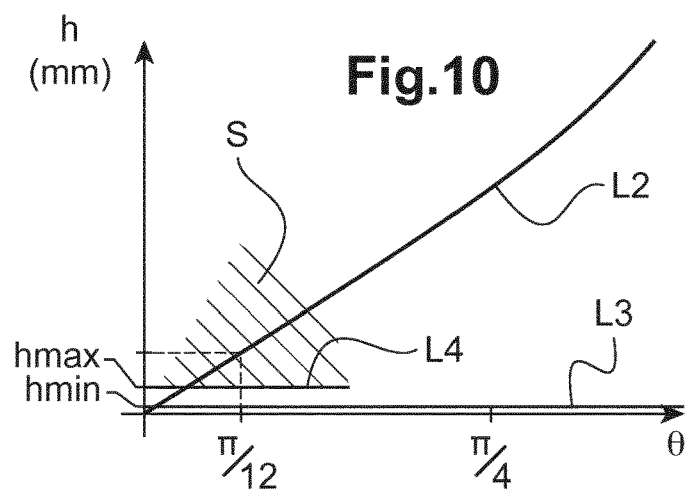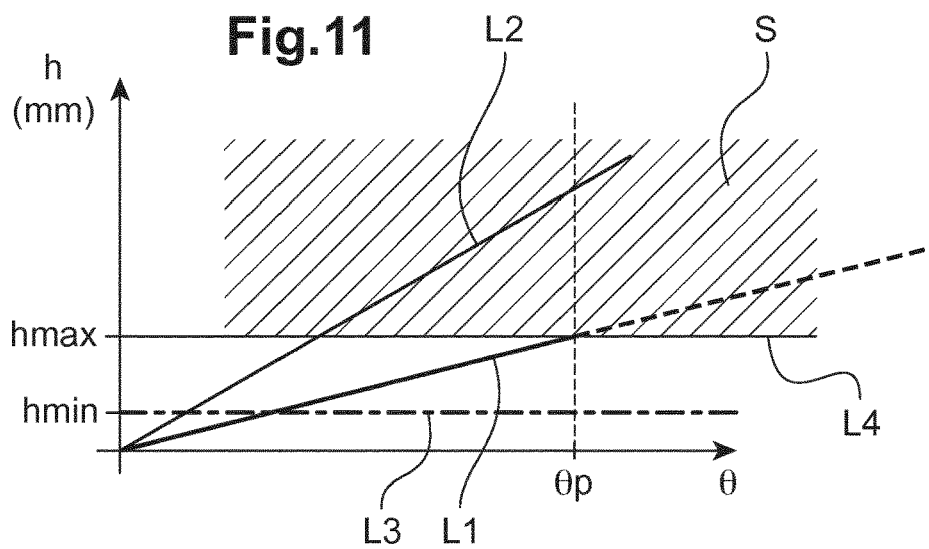

METHOD FOR MANUFACTURING AN OPTICAL LENS BY ADDITIVE MANUFACTURING AND CORRESPONDING INTERMEDIATE OPTICAL ELEMENT

This application is the U.S. national phase of International Application No. PCT/EP2019/075741 filed 24 Sep. 2019, which designated the U.S. and claims priority to EP Patent Application No. 18306258.7 filed 26 Sep. 2018, the entire contents of each of which are hereby incorporated by reference.

TECHNICAL FIELD OF THE INVENTION

The invention relates to the manufacturing of optical lenses.

More precisely the invention relates to a method for manufacturing an optical lens by additive manufacturing.

The invention also relates to an intermediate optical element manufactured by additive manufacturing.

BACKGROUND INFORMATION AND PRIOR ART

Using additive manufacturing technology to manufacture an optical lens is of interest because the obtained optical lens is directly shaped to fit the frame that shall carry it and/or the obtained optical lens complies with the wearer's ophthalmic prescription.

The additive manufacturing process needs to be precisely performed; in particular a new layer needs to be positioned very accurately on the already polymerised layer to correctly manufacture the optical lens.

The major drawback of such a technology is that the obtained articles do not have a good surface quality due to the asperities formed by the edges of the layers.

There are two main methods for improving the surface quality of the lenses in additive manufacturing. A first method consists in decreasing the thickness of the layers thereby minimizing the asperities; however this method increases the manufacturing time since more layers have to be deposited. A second method consists in post-processing the surface of the lens by polishing the asperities; however a precise polishing increases the manufacturing time.

There is a need to find a method that produces optical lenses with good surface quality without increasing the manufacturing time.

SUMMARY OF THE INVENTION

Therefore one object of the invention is to provide a method for manufacturing an optical lens by additive manufacturing, comprising steps of:
  depositing a first layer having a first thickness,
  depositing a second layer, having a second thickness, onto the first layer, said second layer forming a first asperity with the first layer,
  depositing a third layer having a third thickness,
  depositing a fourth layer having a fourth thickness onto the third layer, thereby forming an intermediate optical element, said fourth layer forming a second asperity with the third layer,
  smoothing the first asperity and the second asperity on the intermediate optical element, thereby forming the optical lens.

According to the invention, said second thickness and said fourth thickness are different.

In general, the smoothing of an asperity depends not only on its thickness (which depends on the thickness of the layer), but also on its location in the intermediate optical element. It is generally easier and faster to remove an asperity situated at the periphery of the intermediate optical element, than an asperity situated at its apex.

Hence, for an intermediate optical element whose layers have the same thickness, the smoothing will be achieved faster at the periphery than at the center. The smoothing step then has to take this difference into account. This may be a complicated process and increase the manufacturing time.

Here, the thickness of each layer is determined based on the position of the layer in the intermediate optical element and in order to simplify the smoothing step.

For example, by having thicker layers near the periphery and thinner layer near the apex, it is possible to remove all the asperities at the same rate. Thanks to the method of the invention, the smoothing step is simplified, and the manufacturing time is reduced.

Other advantageous and non-limiting features of the method according to the invention include:
  the thickness of each layer of said layers is determined based on the position of the concerned layer in the intermediate optical element,
  a first smoothing time necessary to smooth the first asperity is equal to a second smoothing time to smooth the second asperity,
  the method also comprises a step of determining geometrical parameters of the first layer, the second layer, the third layer and the fourth layer based on smoothing parameters,
  the method also comprises a step of determining geometrical parameters of the first layer, the second layer, the third layer and the fourth layer based on curvature of the optical lens,
  geometrical parameters of the first layer, the second layer, the third layer and the fourth layer are determined such that a first smoothing time necessary to smooth the first asperity is equal to a second smoothing time to smooth the second asperity,
  the geometrical parameters include the first thickness of the first layer, the second thickness of the second layer, the third thickness of the third layer and the fourth thickness of the fourth layer,
  the geometrical parameters include a first exposed length of the first layer, a second exposed length of the second layer, a third exposed length of the third layer and a fourth exposed length of the fourth layer,
  the intermediate optical element is rotation symmetrical,
  a cross sectional area of the first asperity (in a given plane of the intermediate optical element, for instance a radial plane when the intermediate optical element is rotation symmetrical) is equal to a cross sectional area of the second asperity (in said given plane),
  the cross sectional area of the first asperity is evaluated as the surface (in said given plane) of a depression between the end of the second layer and the first layer,
  the cross sectional area of the second asperity is evaluated as the surface (in said given plane) of a depression between the end of the fourth layer and the third layer,
  the smoothing step includes polishing the surface of the intermediate optical element,
  the smoothing step includes applying a coating onto the surface of the intermediate optical element,
  a first volume of coating is applied onto the first asperity, and a second volume of coating is applied onto the second asperity.

The invention also relates to an intermediate optical element manufactured by additive manufacturing comprising:
- a first layer having a first thickness,
- a second layer having a second thickness lying on the first layer, said second layer forming a first asperity with the first layer,
- a third layer having a third thickness, and
- a fourth layer having a fourth thickness lying on the third layer, said fourth layer forming a second asperity with the third layer.

According to the invention, said second thickness and said fourth thickness are different.

Other advantageous and non-limiting features of the intermediate optical element according to the invention include:
- a product of the thickness of a layer by the exposed length of another layer juxtaposed to the layer is constant over the intermediate optical element,
- the intermediate optical element comprises a first end layer, a second end layer and a plurality of layers situated between the first end layer and the second end layer, each layer having a thickness and an exposed length
- the thickness increases with the layers (layer by layer) from the first end layer to the second end layer and wherein the exposed length decreases from the first end layer to the second end layer,
- the thickness is constant from the first end layer to a first transition layer and increases from the first transition layer to the second end layer, and wherein the exposed length decreases from the first end layer to a second transition layer and is constant from the second transition layer to the second end layer,
- the first end layer comprises the fourth layer,
- the second end layer comprises the first layer,
- the first thickness of the first layer is greater than the fourth thickness of the fourth layer,
- the first exposed length of the first layer is shorter than the fourth exposed length of the fourth layer.

Each thickness (and/or exposed length) mentioned above may be a thickness (or an exposed length) in at least a plane of the intermediate optical element, in particular in a radial plane of the intermediate optical element when the intermediate optical element is rotation symmetrical.

BRIEF DESCRIPTION OF THE DRAWINGS

The method and intermediate optical element according to the invention will be described next, in reference with the appended drawings.

In the appended drawings:

FIG. 4 illustrates a top view of a detail of the intermediate optical element of FIG. 2, FIG. 5 illustrates a sectional view of an optical lens manufactured by the system of FIG. 1, FIG. 6 is a schematic representation of the steps of the method according to the invention, FIG. 9 is a graph of the variation of another geometrical parameter as a function of the position of a point of intermediate optical element 5, FIG. 10 is a graph illustrating the problematic of smoothing the intermediate optical element, FIG. 11 is a graph illustrating the variation of the geometrical parameter for a first embodiment of the method.

DESCRIPTION OF THE PREFERRED EMBODIMENTS

Figure 1:
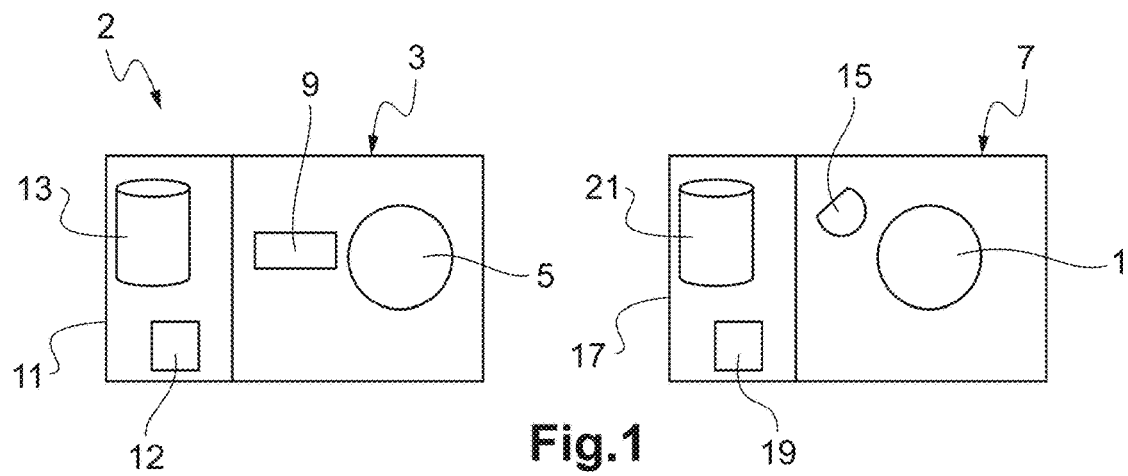
FIG. 1 illustrates a system for manufacturing an optical lens by additive manufacturing.

FIG. 1 shows a system 2 for manufacturing an optical lens 1. The system includes an additive manufacturing machine 3 for producing an intermediate optical element 5. The system includes a smoothing machine 7 for smoothing intermediate element 5 into optical lens 1.

Additive manufacturing machine 3 comprises a depositing device 9. Depositing device 9 is suitable for manufacturing intermediate optical element 5 using an additive manufacturing technology. The expression "additive manufacturing technology" refers to processes that manufacture solid objects by juxtaposing volume elements or voxels. In the case of the present invention, intermediate optical element 5 is thus manufactured volume element by volume element, layer by layer. The additive manufacturing technology may be in practice stereolithography (SLA) or polymer jetting or continuous liquid interface production (CLIP) technology.

In the illustrated example, depositing device 9 comprises a nozzle or a bank of nozzles to deposit the layers.

In the examples described below, a subsequent layer is deposited on a previous layer, thereby defining a deposition axis A. The deposition axis A is thus here perpendicular to the main surfaces of each deposited layer, or, said differently, extends along the thickness of each deposited layer.

Additive manufacturing machine 3 also comprises a first control unit 11 to control depositing device 9. First control unit 11 includes a first microprocessor 12 and a first memory 13. First memory 13 stores instructions that allow additive manufacturing machine 3 to implement a method for manufacturing intermediate optical element 5 as described below, when these instructions are executed by first microprocessor 12.

Smoothing machine 7 includes a smoothing device 15 and a second control unit 17.

Smoothing machine 7 is configured to smooth the surface of intermediate optical element 5 in order to produce optical lens 1.

Smoothing device 15 includes a polishing device able to subtract a volume of material from intermediate optical element 5.

Smoothing device 15 includes, for example, a spindle bearing polishing tool, for example a polishing pupil having a predetermined diameter.

Alternatively, smoothing device 15 may include a vibratory finishing device 15. Vibratory finishing device includes a tub wherein intermediate optical element 5 is placed along with some abrasive material, for example sand. When the tub is vibrated, the sand will rub against the surface of intermediate optical element 5 thereby polishing it.

Alternatively, smoothing device 15 includes a coating deposition machine able to add a volume of material to intermediate optical element 5.

Second control unit 17 includes a second microprocessor 19 and a second memory 21. Second memory 21 stores parameters that allow smoothing machine 7 to implement a method for smoothing intermediate optical element 5 as described below when these instructions are executed by second microprocessor 19.

In the case of a polishing pupil, the parameters include, for example, the trajectory of the polishing pupil over the surface of intermediate optical element 5, the number of scans to carry out, the rotational speed of the polishing pupil and/or the rotational speed of intermediate optical element 5, and an angle of a polishing pupil axe with the surface of intermediate optical element 5.

In the case of a vibratory bowl, the parameters include the duration of the smoothing and the kind of abrasive material and its average size in case of a vibratory finishing device 15.

In case of a thin film deposition machine, the parameters include the volume of coating or the average thickness of the coating.

Figure 2:
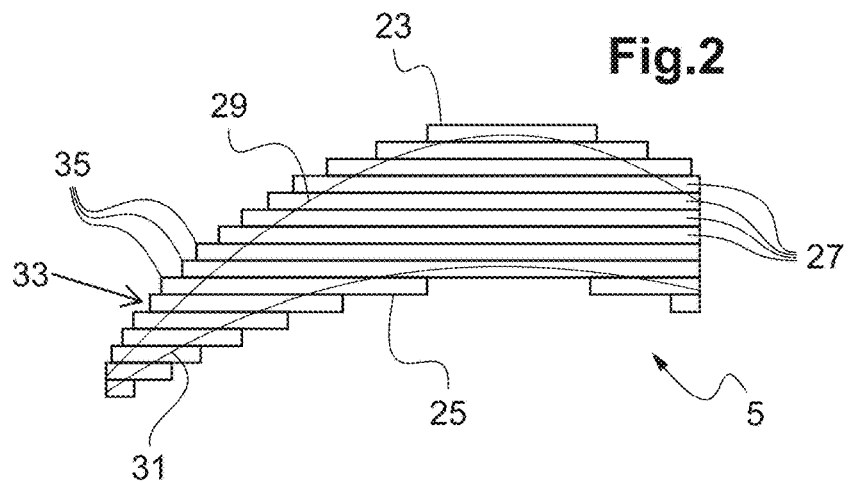
FIG. 2 illustrates a sectional view of an intermediate optical element manufactured by the system of FIG. 1.

FIG. 2 schematically illustrates intermediate optical element 5. In the present example, intermediate optical element 5 has a body provided with a first face 23 that is here convex, and a second face 25 that is here concave.

Intermediate optical element 5 has a peripheral edge connecting first face 23 to second face 25.

Intermediate optical element 5 is here formed by a plurality of predetermined volume elements that are juxtaposed and superposed to form a stack of superposed layers 27 of material.

These predetermined volume elements have a different geometry and a different volume from each other. These volume elements may also consist of the same material, or as a variant may consist of at least two different materials, for example having distinct refractive indices.

FIG. 2 also indicates with dotted lines a target first face 29 and a target second face 31. Target first face 29 corresponds to a first face 45 of optical lens 1, as illustrated on FIG. 5. Target second face 31 corresponds to a second face 47 of optical lens 1.

Target surfaces 29 and 31 are determined beforehand, for example in view of the ophthalmic prescription of the wearer of the lens.

First face 23 and second face 25 of intermediate optical element 5 have asperities 33 formed by the edges of layers 27 where the first face 23 and second face 25 depart from the target faces 29, 31.

A center or apex of the intermediate optical element 5 may thus be defined as corresponding to the uppermost point of the target first face 29 along deposition axis A. The layer of the intermediate optical element 5 defining the center or apex is thus here the layer deposited last. When the intermediate optical element 5 is rotation-symmetrical (and the axis of the rotation symmetry is parallel to the deposition axis), this center or apex is situated on the axis of the rotation symmetry.

In the example of FIG. 2, the periphery of the intermediate optical element 5 corresponds to the lowermost regions of the intermediate optical element 5 along the deposition axis (i.e. to the regions deposited first).

Figure 3:
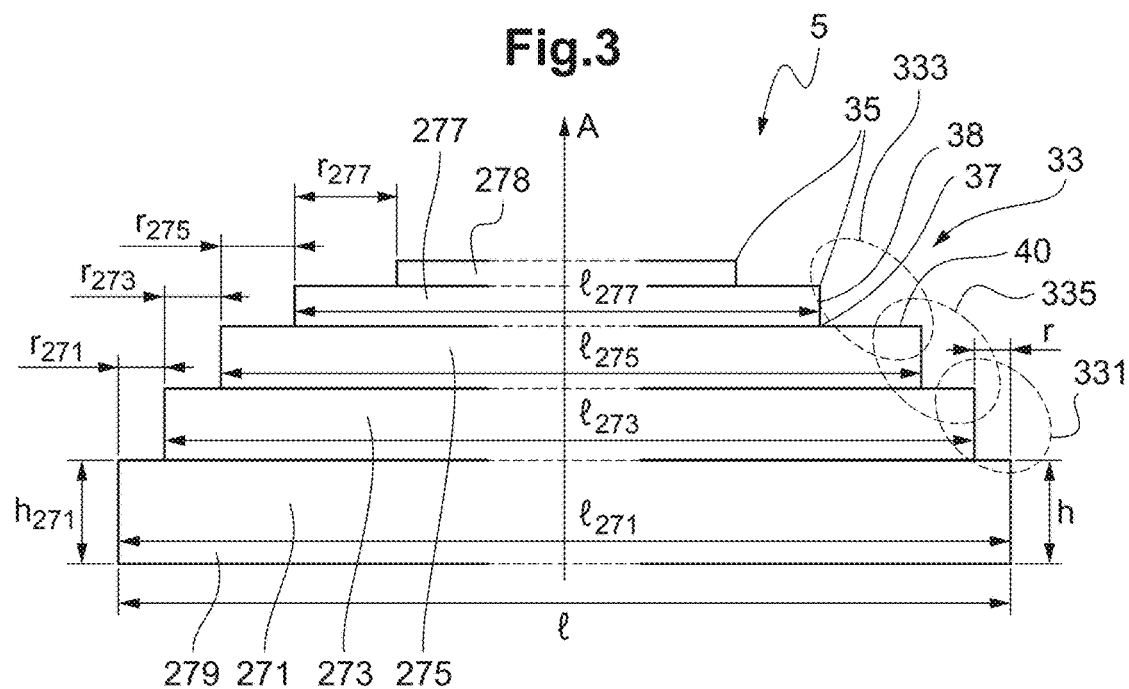
FIG. 3 illustrates a detailed sectional view of the intermediate optical element of FIG. 2, its layers and some of their geometrical parameters.

FIG. 3 illustrates a detail of first face 23 of a first embodiment of intermediate optical element 5.

Superposed layers 27 form "stair-step" at the interface between a lower layer and the end of the upper juxtaposed layer in the direction of an axis A which is, here, a deposition axis A. The "stair-step" has an exposed surface 40 which is not covered by the upper juxtaposed layer.

Each layer 27 is here provided with a peak 35, also called a high point, which is located at the free end of the layers 27, and a depression 37, also called a low point, that is located at the junction between the end of an upper layer and the lower layer immediately below.

Each layer 27 is furthermore provided with a shoulder 38 arranged between the peak 35 and the depression 37 and substantially representative of the thickness h of the layer 27.

Each layer 27 further has a length I. The superposed layers 27 illustrated here, have different lengths I in order to form first face 23 and second face 25.

Each layer further has an exposed length r which corresponds to the length of exposed surface 40.

The superposed layers 27 illustrated here, have different lengths I in order to form first face 23 and second face 25.

An asperity 33 is formed at the free ends of two adjacent layers 27. As explained below, the volume or cross-sectional surface (in a given plane) of an asperity 33 may be estimated by considering the volume or cross-sectional surface of the corresponding depression 37, or, as a variation, by considering the volume or cross-sectional surface of the corresponding peak 35.

A first layer 271, a second layer 273, a third layer 275 and a fourth layer 277 are illustrated in FIG. 3.

First layer 271 has a first thickness $h_{271}$, a first length $l_{271}$ and a first exposed length $r_{271}$.

Second layer 273 lies on top of first layer 271. Second layer has a second thickness $h_{273}$, a second length $l_{273}$ and a second exposed length $r_{273}$. The exposed surfaces of first layer 271 and second layer 273 form a first asperity 331.

Third layer 275 has a third thickness $h_{275}$, a third length $l_{275}$ and a third exposed length $r_{275}$. In the example illustrated by FIG. 3, third layer 275 lies on top of second layer 273. Alternatively, third layer 275 and second layer 273 may not be adjacent. There could be one or more intermediate layers between third layer 275 and second layer 273.

Fourth layer 277 lies on top of third layer 275. Fourth layer 277 has a fourth thickness $h_{277}$, a fourth length $l_{277}$ and a fourth exposed length $r_{277}$. The exposed surfaces of third layer 275 and fourth layer 277 form a second asperity 333.

Since in this example, third layer 275 lies on top of second layer 273, the exposed surfaces of second layer 273 and third layer 275 form a third asperity 335.

Intermediate optical element 5 also has a first end layer 278 and a second end layer 279 (which is, in this represented example, first layer 271).

Second end layer 279 is the layer deposited first along a deposition axis A. First layer 278 is the layer deposited last along deposition axis A.

In this example, as first face 23 is convex, first length $l_{271}$ is greater than second length $l_{273}$ which is itself greater than third length $l_{275}$, which is itself greater than fourth length $l_{277}$. First end layer 278 is the shortest layer; in some embodiments, second end layer 279 may be the longest layer of intermediate optical element 5.

Each layer 27 has a substantially constant thickness h over their length I. The various layers 27 have, however, respective thicknesses that are different from each other.

In the first embodiment of intermediate optical element 5 illustrated by FIG. 3, first layer 271 has a first thickness $h_{271}$ greater than second thickness $h_{273}$ of second layer $h_{273}$.

Second thickness $h_{273}$ is itself greater than third thickness $h_{275}$ of third layer 275. Third thickness $h_{275}$ is itself greater than fourth thickness $h_{277}$.

In other words, in this first embodiment, thickness h increases from first end layer 278 to second end layer 279.

In other words, layers whose free end is further away from deposition axis A have greater thickness h than layers whose free end is closer to deposition axis A.

First layer 271 extends further than second layer 273 over first exposed length $r_{271}$. Second layer 273 extends further than third layer 275 over second exposed length $r_{273}$. Third layer extends further than fourth layer 277 over third exposed length $r_{275}$.

In other words, in this first embodiment, exposed length r decreases from first end layer 278 to second end layer 279.

In other words, layers whose free end is further away from deposition axis A have shorter exposed length r than layers whose free end is closer to deposition axis A.

As illustrated on FIG. 4, the intermediate optical element 5 may not have a rotational symmetry. In this case, the exposed length r of a layer 27 may vary over the layer 27.

For example, exposed length $r_{273}$ of second layer 273 may determined by:

$$r_{273} = r_{273,0} + \Delta r$$

where $r_{273,0}$ may be the minimum exposed length for the second layer 273 and $\Delta r$ is a variation of exposed length in a direction radial with respect to deposition axis A.

In other embodiments, the intermediate optical element 5 has a rotational symmetry. The layers 27 of such an intermediate optical element 5 each have a constant exposed length r.

In a second embodiment of the intermediate optical element (not represented), thickness h is constant from the first end layer to a first transition layer. Thickness h then increases from the first transition layer to the second end layer.

In this second embodiment, exposed length r of the layers increases from first end layer to a second transition layer. Exposed length is then constant from second transition layer to second end layer.

In an example of the second embodiment, first transition layer and second transition layer are the same layer. In another example of the second embodiment, first transition layer and second transition layer are different layers.

FIG. 5 illustrates optical lens 1 obtained after smoothing intermediate optical element 5. First face 45 and second face 47 of optical lens 1 are smoothed to comply with ophthalmic requirements.

The method for manufacturing an optical lens by additive manufacturing is based on the deposition of layers 27 of optical material and on their subsequent smoothing.

FIG. 6 is a schematic representation of the steps of the method for manufacturing an optical lens by additive manufacturing.

In a step S0, the manufacturing settings for the additive manufacturing of optical lens 1 are determined. Step S0 is implemented by first control unit 11. The manufacturing settings include, for example, the number of layers 27 to be deposited, the thickness h, the length I and the exposed length r of each layer 27, the material to be deposited.

In a step S01, first control unit 11 receives a file containing prescription values for a wearer of optical lens 1 to be manufactured. First control unit 11 also receives complementary fitting and personalization data relating to the wearer and/or to a frame intended to receive ophthalmic lens 1. These complementary fitting and personalization data correspond, for example, geometrical values that especially characterize the frame and the visual behavior of the wearer. Complementary fitting and personalization data include, for example, an eye-lens distance, a position of the rotation center of the eye etc.

In a step S02, first control unit 11 determines a corrective optical function tailored to the wearer from the wearer prescription values and the complementary fitting and personalization data.

In a step S03, first control unit 11 determines target geometric characteristics for the optical lens 1 to be manufactured from the optical function.

Target geometric characteristics include, for example coordinates (x, y, z) of a finite number of points of optical lens 1. Alternatively, target geometric characteristics include a surface function z=f(x, y) defining target first face 29 and target second face 31.

In a step S04, first control unit 11 also receives a file containing smoothing data. Smoothing data includes, for example, the diameter of the polishing pupil, the speed of rotation, the speed of the scan, the pressure the pupil exerts on the surface of the intermediate optical element 5.

In a step S05, first control unit 11 determines geometric characteristics of intermediate optical element 5 based on the smoothing data and on the target geometric characteristics. First control unit 11 then generates a file containing the determined geometric characteristics of intermediate optical element 5.

The geometric characteristics may take the form of, for example coordinates (x, y, z) of a finite number of points of intermediate optical element 5. Alternatively, the geometric parameters may take the form of a surface function z=f(x, y) defining first face 23 and second face 25 intermediate optical element 5.

FIGS. 7 to 13 illustrate how the geometrical characteristics may be determined.

This explanation is given by considering a particular plane across the intermediate optical element 5, here a radial plane of a rotational-symmetric intermediate optical element 5 (i.e. a plane containing the axis of the rotation symmetry). The solution also applies however to intermediate optical element 5 that are not rotation-symmetric either by determining the geometrical characteristics separately in several distinct planes crossing the intermediate optical element 5 (and possibly by determining the geometric characteristics outside these planes by interpolation), or by determining the geometrical characteristics in a particular plane crossing the intermediate optical element 4 as described below and by using the determined characteristics in other planes. These solutions make it possible to homogenize the volume of asperities optical lenses generally have a shape that is nearly rotation-symmetric.

Figure 7:
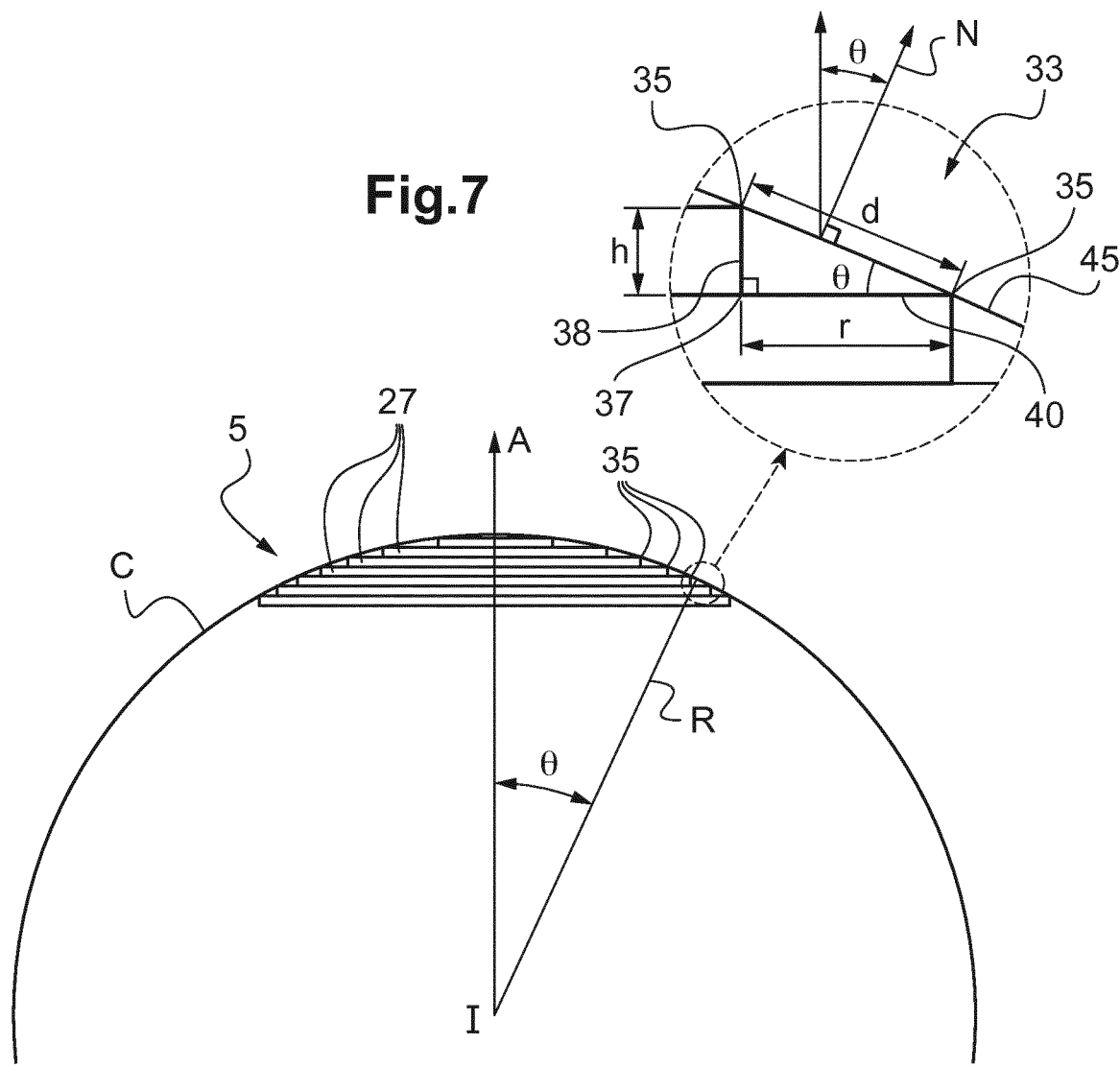
FIG. 7 illustrates the intermediate optical element of FIG. 2 and its envelope curve.

FIG. 7 illustrates intermediate optical element 5 and its envelope curve C. Curve C passes by every peak 35 of the layers 27. In the embodiment shown in FIG. 7, intermediate optical element 5 has a spherical envelope, and curve C is a circle of center I. Other types of curve are possible. In order to determine the geometrical characteristics of the layers, curve C is approximated by lines joining adjacent peaks 35. As shown in the detail view included in FIG. 7, a line d joins the two adjacent peaks 35 represented. FIG. 7 also illustrates deposition axis A.

Angle θ represents the angle between the free end of a layer 27 (i.e. the exposed surface 40 of layer 27) and straight line d. The further the free end is from deposition axis A, the greater the angle θ.

Angle θ is thus also the angle between deposition axis A (orthogonal to the exposed surface of layer 27) and a straight line N normal to straight line d and passing by depression 37. As curve C is a circle in the present example and straight line d approximate curve C, angle θ (between deposition axis A and straight line N) corresponds to the angle between deposition axis A and a the radius R of circle C passing through depression 37 and angle θ is then representative of the position of a point (depression 37) on the first face 23 of intermediate element 5.

Since a triangle formed by shoulder 38, exposed surface 40 and straight line d is a right angle triangle, angle θ can be determined with the formula:

$$\tan\theta = \frac{h}{r}$$

This formula establishes a relationship between the thickness h and the exposed length r of a layer 27 and its position in the intermediate optical element 5.

As it is now explained, to facilitate the smoothing step and improve the quality of resulting optical lens 1, not all the thicknesses h and exposed lengths r are desirable.

Boundaries conditions used to determine the thickness h and the exposed length r of the layers 27 are now described.

Figure 8:
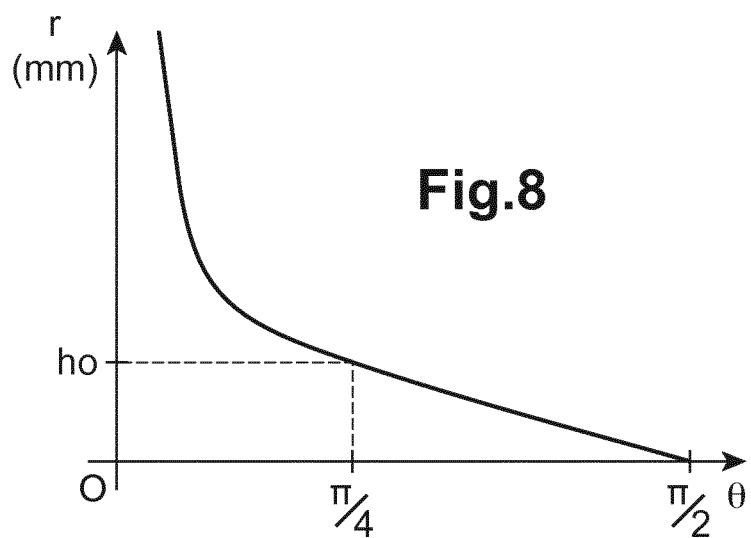
FIG. 8 is a graph of the variation of a geometrical parameter as a function of the position of a point of intermediate optical element 5.

FIG. 8 represents a graph of the variation of the exposed length r as a function of angle θ at a constant thickness $h_c$ for a point of intermediate optical element 5.

As the value of angle θ increases, the value of exposed length r decreases. In other words, the layers 27 extending further away from deposition axis A have shorter exposed lengths r than shorter layers.

As a consequence, the asperities 33 become easier to smooth with increasing angle θ. In other words, for one scan of the pupil, the asperities 33 further from deposition axis A are removed faster than the asperities closer to deposition axis A. In other words, the smoothing is achieved faster at the periphery than near the center (here, the apex) of intermediate optical element 5.

If the number of scans is set based on the smoothing of the asperity 33 at the periphery, then the asperity near the center will not have reached target at the end of the smoothing step.

If the number of scans is set based on the smoothing of the asperity 33 at the center, then too much material will have been removed at the periphery at the end of the smoothing step.

Hence, it is not desirable that all the layers 27 have the same thickness h.

In addition, there exists a maximum exposed length rmax beyond which the difficulty of the smoothing of the asperities is considered difficult (for example, the optical lens produced is not of ophthalmic quality). Hence, it is not desirable for the layers to have an exposed length r greater than the maximum exposed length rmax. The maximum exposed length rmax may be determined experimentally.

FIG. 9 represents a graph of the variation of the thickness h as a function of angle θ at a constant exposed length $r_c$ for a point of intermediate optical element 5.

The value of constant exposed length $r_c$ is determines by the geometrical requirements of first end layer 278.

As the value of angle θ increases, the value of thickness h also increases.

As a consequence, the asperities 33 become harder to smooth with increasing angle θ. In other words, for one scan of the pupil, the asperities 33 closer to deposition axis A are removed faster than the asperities further from deposition axis A. In other words, the smoothing is achieved faster near the center than at the periphery of intermediate optical element 5.

If the number of scans is set based on the smoothing of the asperity 33 at the periphery, then too much material will have been removed at the center at the end of the smoothing step.

If the number of scans is set based on the smoothing of the asperity 33 near the center, then the asperity at the periphery will not have reached target at the end of the smoothing step.

Hence, it is not desirable that all the layers 27 have the same exposed length r.

In addition, there exists a maximum thickness hmax beyond which the difficulty of the smoothing of the asperities is increased. Hence, it is not desirable for the layers 27 to have a thickness greater than maximum thickness hmax. Maximum thickness hmax may be determined experimentally.

On the graph of FIG. 10 a second line L2 illustrates the variation of thickness h as a function of angle θ for point of a common intermediate optical element 5 and for a constant exposed length $r_c$.

A common value for the diameter of intermediate optical element 5 is 62 mm. A common value for the radius of curvature of intermediate optical element 5 is 125 mm. A common value for the refractive index of intermediate optical element 5 is 1.5.

As a result, a common value for angle θ at the periphery of intermediate optical element 5 is π/12.

A common value for the exposed length of top layer 279 is 1.6 mm, it is, here, the value of the constant exposed length $r_c$.

A current minimum thickness hmin, as determined by the current state of additive manufacturing technologies, is 10 μm. The minimum thickness hmin is illustrated by a third line L3.

A shaded area S indicates a set of points of coordinates (h, θ) for which smoothing is considered difficult. The set of points is, for example, determined experimentally. For example a test intermediate optical element of geometrical characteristics comprised to in the set of points does not provide an optical lens of ophthalmic quality.

The shaded area S has a lower limit represented by a fourth line L4. The lower limit corresponds to maximum thickness hmax. A common value for maximum thickness hmax is, for example, 13 μm.

As it is visible on the graph of FIG. 10, for a constant exposed length $r_c$, the maximum thickness hmax is reached for an angle θ smaller than the desired π/12.

In other words, it is not possible to achieve an intermediate optical element 5 of angle π/12 with a constant exposed length $r_c$.

To determine thicknesses h and exposed length r that are well adapted for the subsequent smoothing, a first embodiment of the method is to vary the value of the thickness h and of the exposed length r over the whole intermediate optical element 5. The first embodiment of the method produces the first embodiment of intermediate optical element 5 (represented on FIG. 3).

On the graph of FIG. 11, first line L1 represents the variation of thickness h as a function of angle θ wherein the thickness h increases with increasing angle θ, and wherein the exposed length r decreases with increasing angle θ. Second line L2 represents the variation of thickness h as a function of angle θ for a constant exposed length r.

Third line L3 represents the minimum thickness value (for example, 10 µm).

A fourth line L4 represents the minimum thickness value of the shaded area S, i.e. the maximum thickness hmax (for example 13 µm)

Angle $\theta_p$ represents the angle at the periphery of intermediate optical element 5.

To achieve an optimal smoothing, all the points of coordinates (h, θ) (and their corresponding exposed length r) situated in the zone delimited by first line L1, second line L2, third line L3 and fourth line L4 may be used to determine the parameters of intermediate geometrical element 5, including the thickness h and the exposed length r of the layers 27.

A variant of the first embodiment of the method is to determine the parameters, including the thickness t and the exposed length r of the layers 27, such that cross sectional area of the asperity 33 in a radial plane remains constant for all layers 27.

Figure 12:
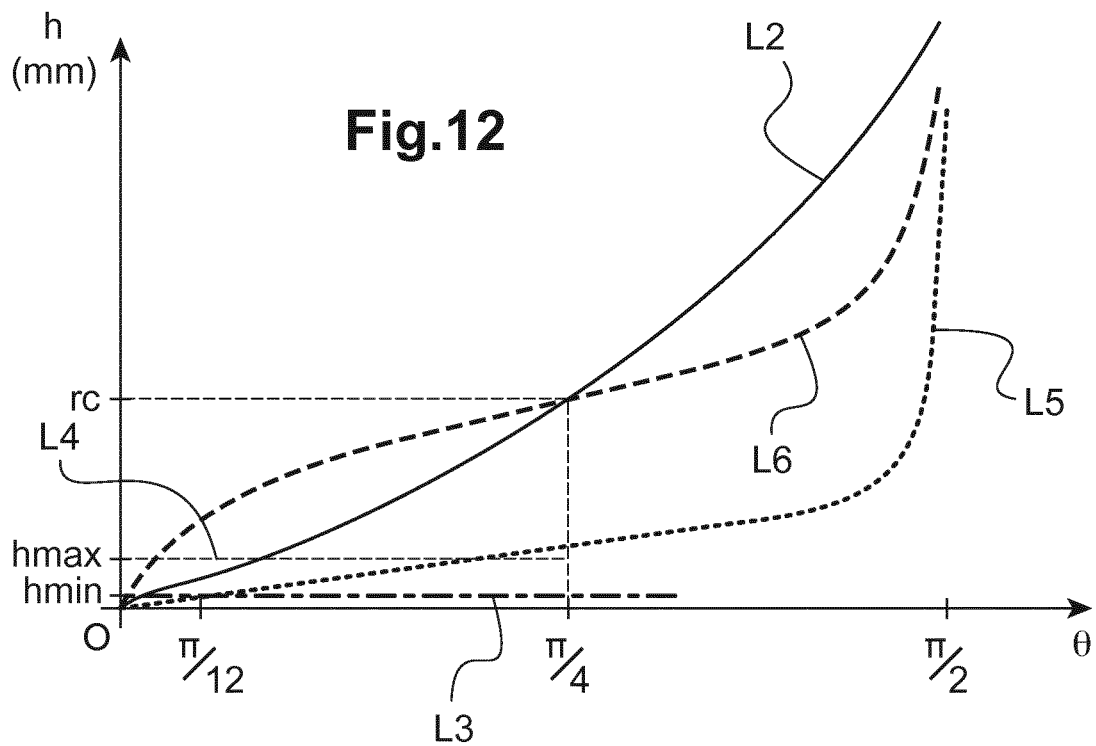
FIG. 12 is a graph illustrating the variation of the geometrical parameter for a variant of the first embodiment of the method.

This variant, represented on the graph of FIG. 12, facilitates the smoothing of the intermediate optical element 5 as the polishing pupil approximatively polishes the same volume for each asperity 33 during the scanning of intermediate optical element 5.

The graph of FIG. 12 represents another graph of the variation of the thickness h as a function of angle θ for a varying exposed length r. The graph of FIG. 12 includes the variant of the first embodiment of the method.

Second line L2 represents the variation of thickness h for a constant exposed length (as represented in FIG. 10).

Fifth line L5 represents the variation of thickness h when keeping the cross sectional area of the asperities 33 constant as proposed above.

The surface $S_{asp27g}$ of the asperity of top layer 279, evaluated in the present case by considering the cross section of depression 37, is given by:

$$2S_{asp279} = h \times r$$

where, as seen previously:

$$r = \frac{h}{\tan\theta}$$

then:

$$h = k \times (\tan\theta)^{1/2}$$

where:

$$k = \sqrt{2S_{asp279}}$$

To achieve an optimal smoothing, all the points comprised between second line L2 and fifth line L5 may be used to determine the geometric file of intermediate optical element 5. However, to keep the surface of the asperity constant during the polishing step, the points near fifth line L5 should be selected.

On the graph of FIG. 12, a sixth line L6 represents the variation of thickness h when keeping the section of the surface of the asperities 33 constant for a constant exposed length $r_c$. However, it is visible that the maximum thickness hmax is reached for angles θ below the desired π/12. Hence it is not desirable to select points on sixth line L6.

Figure 13:
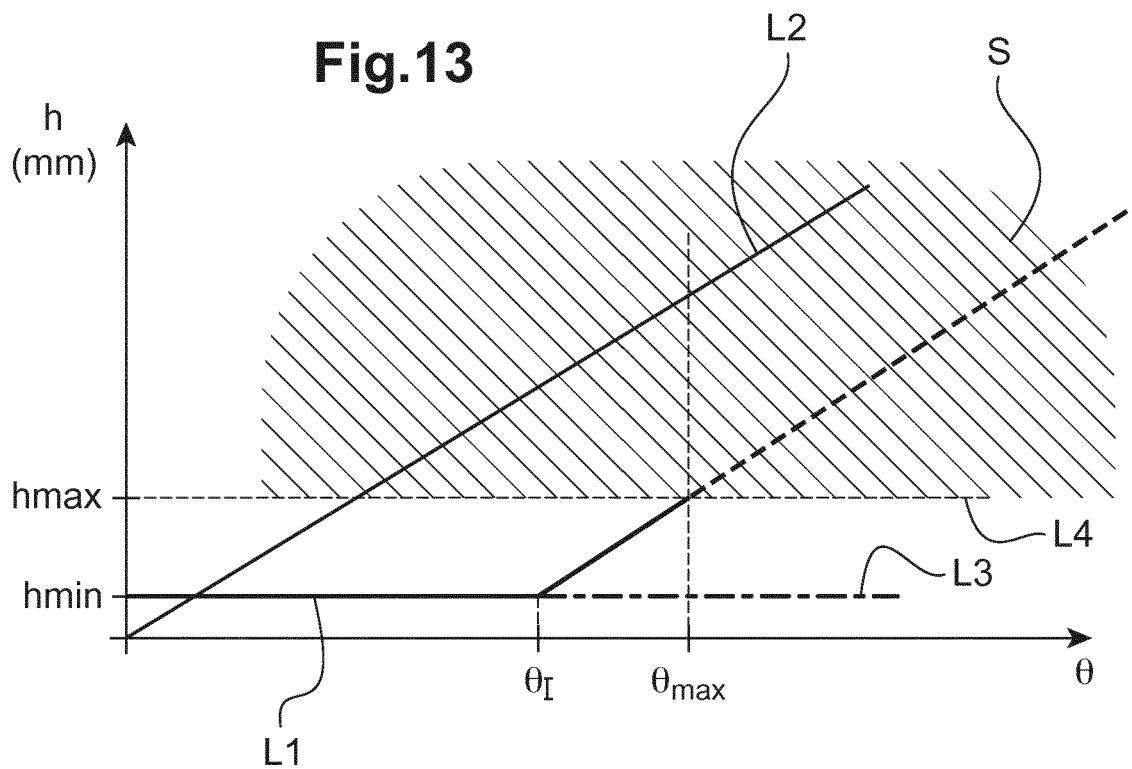
FIG. 13 is a graph illustrating the variation of the geometrical parameter for a second embodiment of the method.

A second embodiment of the method is illustrated on FIG. 13. The second embodiment of the method produces the second embodiment of intermediate optical element 5.

The graph of FIG. 13 illustrates the variation of thickness h in function of angle θ for a second possibility for determining the parameters of intermediate optical element 5.

In this case, thickness h is constant over a first range of angles θ comprised between 0 and a first transition angle $\theta_1$. First transition angle $\theta_1$ corresponds to the angle between deposition axis A and the first transition layer of the second embodiment of the intermediate optical element.

Then, for a second range comprising angles greater than first transition angle $\theta_1$, thickness h increases. The thickness h reaches the maximum thickness hmax for a maximum angle θmax.

Exposed length r increases over another first range of angles comprised between 0 and a second transition angle $\theta_2$. Second transition $\theta_2$ angle corresponds to the angle between deposition axis A and the second transition layer of the second embodiment of the intermediate optical element.

Exposed length r is then constant over another second range comprising angles greater than second transition angle $\theta_2$.

In the present example, first transition angle $\theta_1$ and second transition angle $\theta_2$ are equal.

In a variant of the second embodiment of the method, first transition angle $\theta_1$ and second transition angle $\theta_2$ are different.

To achieve an optimal smoothing, all the points of coordinates (h, θ) (and their corresponding exposed length r) situated in the zone delimited by first line L1, second line L2, third line L3 and fourth line L4 may be used to determine the parameters of intermediate geometrical element 5.

In a step S06, first control unit 11 generates a manufacturing file corresponding to the manufacturing settings of intermediate optical element 5 based on the geometry characteristics of intermediate optical element 5.

This "settings" file is similar to the geometry file of intermediate optical element 5 previously generated, the difference being that is reflects a transcribed description of the geometry desired for this intermediate optical element 5 to be manufactured, with, in practice, an arrangement of the predetermined volume elements of the one or more materials, relative to a frame of reference of the additive manufacturing machine, and an order of deposition of the volume elements relative to one another.

Alternatively, step S0 may be implemented partly or in total by an external calculating unit that subsequently transmits the parameters to first control unit 11.

In a step S1, the layers 27 are deposited by additive manufacturing machine 3. First microprocessor 12 implements the manufacturing settings received from first control unit 11.

In a step S11 a first layer 271 of first thickness $h_{271}$ and first length $l_{271}$ is deposited.

In a step S12, a second layer 273 of second thickness $h_{273}$ and second length $l_{273}$ is deposited onto first layer 271. Second layer 273 is located so as to respect the first exposed length $r_{271}$ of first layer 271.

In a step S13, a third layer 275 of third thickness $h_{275}$ and length $l_{275}$ is deposited onto second layer 273. Third layer 275 is located so as to respect the second exposed length $r_{273}$ of second layer 273.

Alternatively, an intermediate layer (not represented) may be deposited onto second layer 273. The intermediate layer is located so as to respect the second exposed length $r_{273}$ of second layer 273.

Third layer 275 is then deposited onto the intermediate layer. Third layer 275 is located so as to respect the exposed length of the intermediate layer. Alternatively, a plurality of other intermediate layers may be deposited on top of the intermediate layer. Each intermediate layer is located so as to respect the exposed length of the intermediate layer immediately below.

In a step S14, a fourth layer 277 of fourth thickness $h_{277}$ and length $l_{277}$ is deposited onto third layer 275. Fourth layer 277 is located so as to respect the third exposed length $r_{275}$ of third layer 275.

The deposition steps are implemented until all the layers 27 are deposited.

Intermediate optical element 5 is then placed into smoothing machine 7.

In a step S2, smoothing device 15 smooths the surface of intermediate optical element 5. Smoothing instructions are determined or received by second control unit 17.

In the case of a polishing device containing a polishing pupil, smoothing instructions contain the data previously mentioned, such as scan speed, rotational speed of the pupil, number of scan. The smoothing instructions are determined so that the surface of each face 21, 25 of the intermediate optical element 5 need to be submitted to the same number of scans to smooth the asperities 33.

Second microprocessor 19 implements the smoothing instructions and the polishing pupil scans the surface of intermediate optical element 5, thereby smoothing first asperity 331, second asperity 333 and third asperity 335.

According to a variant, the smoothing includes applying a coating onto the surface of the intermediate optical element 5. A first volume of coating is applied onto first asperity 331. A second volume of coating is applied onto the second asperity 333)

The method optionally comprises a step of treating first face 45 and second face 47 of optical lens 1 by adding thereto one or more predetermined functional coatings. The functional coatings include, for example, anti-fog, antireflection, tinted, anti-scratch coatings Alternatively, before the step of deposition, a cylinder of optical material is provided to additive manufacturing machine 3. The cylinder forms a core of intermediate optical element 5. Layers 27 are then deposited around the cylinder to obtain intermediate optical element 5.

The cylinder in buried in the layers 27. The cylinder does not form any asperities of intermediate optical element 5, and hence is not submitted to the smoothing step.

The invention claimed is:

1. A method for manufacturing an optical lens by additive manufacturing, comprising steps of:
   depositing a first layer having a first thickness,
   depositing a second layer, having a second thickness, onto the first layer, said second layer forming a first asperity with the first layer,
   depositing a third layer having a third thickness,
   depositing a fourth layer having a fourth thickness onto the third layer, thereby forming an intermediate optical element, said fourth layer forming a second asperity with the third layer,
   smoothing the first asperity and the second asperity on the intermediate optical element thereby forming the optical lens,
   wherein said second thickness and said fourth thickness are different, and wherein a cross sectional area of the first asperity is equal to a cross sectional area of the second asperity,
   wherein the method is performed to produce the intermediate optical element with a first end layer, a second end layer and a plurality of layers situated between the first end layer and the second end layer, each of the layers having a thickness and an exposed length,
   wherein the thickness increases with the layers from the first end layer to the second end layer and wherein the exposed length decreases from the first end layer to the second end layer, and
   wherein, for each of the layers situated between the first end layer and the second end layer, a product of the thickness of the concerned layer by the exposed length of the layer on which the concerned layer is deposited is equal to a product of the thickness of the first end layer by the exposed length of the layer on which the first end layer is deposited.

2. The method according to claim 1, wherein the thickness of each layer of said layers is determined based on the position of the concerned layer in the intermediate optical element.

3. The method according to claim 2, wherein a first smoothing time necessary to smooth the first asperity is equal to a second smoothing time to smooth the second asperity.

4. The method according to claim 2, further including a step of determining geometrical parameters of the first layer, the second layer, the third layer and the fourth layer based on smoothing parameters.

5. The method according to claim 2, further including a step of determining geometrical parameters of the first layer, the second layer, the third layer and the fourth layer based on curvature of the optical lens.

6. The method according to claim 1, wherein a first smoothing time necessary to smooth the first asperity is equal to a second smoothing time to smooth the second asperity.

7. The method according to claim 6, further including a step of determining geometrical parameters of the first layer, the second layer, the third layer and the fourth layer based on smoothing parameters.

8. The method according to claim 6, further including a step of determining geometrical parameters of the first layer, the second layer, the third layer and the fourth layer based on curvature of the optical lens.

9. The method according to claim 1, further including a step of determining geometrical parameters of the first layer, the second layer, the third layer and the fourth layer based on smoothing parameters.

10. The method according to claim 9, wherein the geometrical parameters include the first thickness of the first layer, the second thickness of the second layer, the third thickness of the third layer and the fourth thickness of the fourth layer.

11. The method according to claim 9, wherein the geometrical parameters include a first exposed length of the first layer, a second exposed length of the second layer, a third exposed length of the third layer and a fourth exposed length of the fourth layer.

12. The method according to claim 1, further including a step of determining geometrical parameters of the first layer, the second layer, the third layer and the fourth layer based on curvature of the optical lens.

13. The method according to claim 1, wherein the smoothing step includes polishing the surface of the intermediate optical element.

14. The method according to claim 1, wherein the smoothing step includes applying a coating onto the surface of the intermediate optical element.

15. The method according to claim 14, wherein a first volume of coating is applied onto the first asperity, and a second volume of coating is applied onto the second asperity.

16. An intermediate optical element manufactured by additive manufacturing, the intermediate optical element comprising:
- a first layer having a first thickness,
- a second layer having a second thickness and lying on the first layer, said second layer forming a first asperity with the first layer,
- a third layer having a third thickness, and
- a fourth layer having a fourth thickness and lying on the third layer, said fourth layer forming a second asperity with the third layer,
- wherein said second thickness and said fourth thickness are different, and wherein a cross sectional area of the first asperity is equal to a cross sectional area of the second asperity,
- wherein the intermediate optical element has a first end layer, a second end layer and a plurality of layers situated between the first end layer and the second end layer, each of the layers having a thickness and an exposed length,
- wherein the thickness increases with the layers from the first end layer to the second end layer and wherein the exposed length decreases from the first end layer to the second end layer, and
- wherein, for each of the layers situated between the first end layer and the second end layer, a product of the thickness of the concerned layer by the exposed length of the layer on which the concerned layer is deposited is equal to a product of the thickness of the first end layer by the exposed length of the layer on which the first end layer is deposited.

17. A method for manufacturing an optical lens by additive manufacturing, the method comprising:
- forming an intermediate optical element by:
  - depositing a layer having an upper surface; and
  - forming a stack of superposed said layers by repeatedly depositing a said layer onto the upper surface of a previously deposited said layer;
  - wherein each said layer has:
    - a length, measured where a perpendicular plane passing through the stack of superposed layers intersects the upper surface; and
    - a thickness,
  - wherein each given one of said layers that has another said layer deposited on the given layer's upper surface additionally has:
    - an exposed length reflecting a portion of the given layer's length that extends beyond the layer deposited on the given layer; and
    - an associated asperity determined by the exposed length of the given layer and the thickness of the layer deposited on the given layer,
  - wherein the thickness of any given said layer is less than the thickness of the layer on which the given layer is deposited, and
  - wherein the exposed length of any given said layer is less than the exposed length of the layer deposited on the given layer; and
  - wherein a product of the exposed length of any given layer by the thickness of the layer deposited on the given layer is constant over the given ones of said layers that have another said layer deposited on the given layer's upper surface; and
- smoothing the asperities on the intermediate optical element thereby forming the optical lens.

* * * * *